United States Patent
Fujikawa

(10) Patent No.: US 10,362,008 B2
(45) Date of Patent: Jul. 23, 2019

(54) INFORMATION PROCESSING SYSTEM CAPABLE OF PERFORMING COMMUNICATION AT HIGH SECURITY LEVEL, METHOD OF CONTROLLING THE SAME, INFORMATION PROCESSING APPARATUS, AND STORAGE MEDIUM

(71) Applicant: CANON KABUSHIKI KAISHA, Tokyo (JP)

(72) Inventor: Ryo Fujikawa, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 73 days.

(21) Appl. No.: 15/097,452

(22) Filed: Apr. 13, 2016

(65) Prior Publication Data

US 2016/0308846 A1     Oct. 20, 2016

(30) Foreign Application Priority Data

Apr. 15, 2015 (JP) .................................. 2015-083192

(51) Int. Cl.
*H04L 29/06* (2006.01)
*G06F 12/14* (2006.01)

(52) U.S. Cl.
CPC ........ *H04L 63/061* (2013.01); *H04L 63/0428* (2013.01); *H04L 63/0478* (2013.01); *H04L 63/0853* (2013.01); *H04L 63/0876* (2013.01); *H04L 63/105* (2013.01)

(58) Field of Classification Search
CPC .............. H04L 63/061; H04L 63/0428; H04L 63/0478; H04L 63/105; H04L 63/0853; H04L 63/0876; G06F 12/1408
See application file for complete search history.

(56) References Cited

U.S. PATENT DOCUMENTS

| | | | | |
|---|---|---|---|---|
| 6,094,485 A * | 7/2000 | Weinstein | ............. | H04L 63/105 380/30 |
| 6,978,367 B1 * | 12/2005 | Hind | ..................... | G06F 21/577 380/273 |
| 8,094,819 B1 * | 1/2012 | Limondin | ........... | G06F 12/1408 380/228 |
| 8,248,633 B2 | 8/2012 | Ohba et al. | | |
| 2004/0243853 A1 * | 12/2004 | Swander | ............. | H04L 63/0236 726/14 |

(Continued)

FOREIGN PATENT DOCUMENTS

JP      2011004117 A      1/2011

*Primary Examiner* — Joseph P Hirl
*Assistant Examiner* — Thomas A Gyorfi
(74) *Attorney, Agent, or Firm* — Rossi, Kimms & McDowell LLP

(57) ABSTRACT

An information processing system that is capable of performing communication at a high security level even when no encryption key having a predetermined or higher encryption strength is stored. An information processing system includes an MFP as an information processing apparatus and a client PC as the other information processing apparatus that is connected to the MFP. The MFP stores encryption keys in a key storage dedicated area of an HDD. When a strong key which is an encryption key difficult to crack is not stored in the key storage dedicated area, the strong key is generated. Communication between the MFP and the client PC is performed using the generated strong key.

9 Claims, 9 Drawing Sheets

(56) References Cited

U.S. PATENT DOCUMENTS

| | | | |
|---|---|---|---|
| 2006/0269053 A1* | 11/2006 | Miyazawa | G06F 21/606 380/28 |
| 2008/0095368 A1* | 4/2008 | Iida | H04L 63/0272 380/259 |
| 2010/0146582 A1* | 6/2010 | Jaber | G06F 21/6218 726/1 |
| 2013/0067213 A1* | 3/2013 | Liu | H04L 9/0819 713/150 |
| 2013/0318630 A1* | 11/2013 | Lam | G06F 21/60 726/28 |
| 2014/0283010 A1* | 9/2014 | Rutkowski | G06F 21/31 726/18 |

* cited by examiner

FIG. 2A

| WEAK KEYS | |
|---|---|
| HASH CODE | SHA1/MD2/MD4/MD5 |
| COMMON KEY CODE | DES/3DES/RC4 |
| PUBLIC KEY CODE | RSA/DSA/DH HAVING KEY LENGTH NOT MORE THAN 1024 BITS |

FIG. 2B

| STRONG KEYS | |
|---|---|
| HASH CODE | SHA256 |
| COMMON KEY CODE | AES |
| PUBLIC KEY CODE | KEY LENGTH NOT LESS THAN 2048 BITS |

FIG. 3A

CERTIFICATE INFORMATION

| | |
|---|---|
| VERSION | X.509V3 |
| SERIAL No. | 001122334455566778899 |
| SIGNATURE ALGORITHM | MD5RSA |
| ISSUED TO | CN=Canon |
| VALIDITY START | 2012/1/1 |
| VALIDITY END | 2018/12/31 |
| ISSUER | CN=Canon |
| PUBLIC KEY | RSA 1024bit |
| CERTIFICATE STAMP | 00001111222233334444555566667777888899999 |

SET

FIG. 3B

CERTIFICATE INFORMATION

9988776655544332211

| | |
|---|---|
| VERSION | X.509V3 |
| SERIAL No. | 9988776655544332211 |
| SIGNATURE ALGORITHM | SHA256RSA |
| ISSUED TO | CN=Canon |
| VALIDITY START | 2012/1/1 |
| VALIDITY END | 2018/12/31 |
| ISSUER | CN=Canon |
| PUBLIC KEY | RSA 2048bit |
| CERTIFICATE STAMP | 000011112222333344445555666677778888999912011202120 |

SET

*FIG. 9*

ENCRYPTION KEY LIST

| KEY NAME | USE OF KEY | CERTIFICATE |
|---|---|---|
| Key 1 | – | ☐ |
| Key 2 | – | ☐ |
| Key 3 | – | ☐ |
| Key 4 | – | ☐ |
| Key 5 | – | ☐ |
| Key 6 | – | ☐ |

INFORMATION PROCESSING SYSTEM CAPABLE OF PERFORMING COMMUNICATION AT HIGH SECURITY LEVEL, METHOD OF CONTROLLING THE SAME, INFORMATION PROCESSING APPARATUS, AND STORAGE MEDIUM

BACKGROUND OF THE INVENTION

Field of the Invention

The present invention relates to an information processing system that is capable of performing communication at a high security level, a method of controlling the information processing system, an information processing apparatus, and a storage medium.

Description of the Related Art

Conventionally, there has been known an information processing apparatus that is capable of setting a security policy (see e.g. Japanese Patent Laid-Open Publication No. 2011-004117). This information processing apparatus stores an encryption key which does not have a predetermined or higher encryption strength and hence is easy to crack (hereinafter referred to as the "weak key"), and an encryption key having the predetermined or higher encryption strength and hence difficult to crack (hereinafter referred to as the "strong key"), e.g. in a memory. The weak key is an encryption key with a key length not more than 1024 bits, which uses SHA1, MD2, MD4, MD5, DES, 3DES, or RC4 as a hash function and is also generated by an RSA, DSA, or DH algorithm. The strong key is an encryption key with a key length not less than 2048 bits, which uses SHA256 as a hash function.

In the information processing apparatus disclosed in Japanese Patent Laid-Open Publication No. 2011-004117, for example, when a security policy that specifies inhibition of communication at a low security level using the weak key (hereinafter referred to as the "weak key use-inhibiting security policy") is enabled, communication with the other information processing apparatus, using the stored weak key, is inhibited, but communication with the other information processing apparatus is encrypted by using the stored strong key, whereby communication with the other information processing apparatus is performed at a high security level.

However, there is a case where the information processing apparatus stores only a weak key but does not store a strong key, and if the weak key use-inhibiting security policy is enabled in this case, the information processing apparatus cannot perform communication with the other information processing apparatus. In short, there is a problem that communication at a high security level cannot be performed.

SUMMARY OF THE INVENTION

The present invention provides an information processing system that is capable of performing communication at a high security level even when no encryption key having a predetermined or higher encryption strength and hence difficult to crack is stored, a method of controlling the information processing system, an information processing apparatus, and a storage medium.

In a first aspect of the present invention, there is provided an information processing system including an information processing apparatus and another information processing apparatus that is connected to the information processing apparatus, comprising a storage unit configured to store an encryption key, a generation unit configured to generate an encryption key that is different from the encryption key stored in the storage unit and has a predetermined or higher encryption strength, and an execution unit configured to execute communication between the information processing apparatus and the other information processing apparatus, using the generated encryption key having the predetermined or higher encryption strength.

In a second aspect of the present invention, there is provided an information processing apparatus that is connected to another information processing apparatus, comprising a storage unit configured to store an encryption key, a generation unit configured to generate an encryption key that is different from the encryption key stored in the storage unit and has a predetermined or higher encryption strength, and an execution unit configured to execute communication between the information processing apparatus and the other information processing apparatus, using the generated encryption key having the predetermined or higher encryption strength.

In a third aspect of the present invention, there is provided a method of controlling an information processing system including an information processing apparatus and another information processing apparatus that is connected to the information processing apparatus, comprising storing an encryption key, generating an encryption key that is different from the encryption key stored by said storing and has a predetermined or higher encryption strength, and executing communication between the information processing apparatus and the other information processing apparatus, using the generated encryption key having the predetermined or higher encryption strength.

In a fourth aspect of the present invention, there is provided a non-transitory computer-readable storage medium storing a computer-executable control program for causing a computer to execute a method of controlling an information processing system including an information processing apparatus and another information processing apparatus that is connected to the information processing apparatus, wherein the method comprises storing an encryption key, generating an encryption key that is different from the encryption key stored by said storing and has a predetermined or higher encryption strength, and executing communication between the information processing apparatus and the other information processing apparatus, using the generated encryption key having the predetermined or higher encryption strength.

According to the present invention, it is possible to perform communication at a high security level even when no encryption key having the predetermined or higher encryption strength and hence difficult to crack is stored.

Further features of the present invention will become apparent from the following description of exemplary embodiments (with reference to the attached drawings).

BRIEF DESCRIPTION OF THE DRAWINGS

FIG. 2A is a diagram useful in explaining data concerning an encryption key which is stored in an HDD appearing in FIG. 1, and is a weak key used for communication when a weak key use-inhibiting security policy is disabled in the MFP.

FIG. 2B is a diagram useful in explaining data concerning an encryption key which is stored in the HDD, and is a strong key used for communication when the weak key use-inhibiting security policy is enabled in the MFP.

FIG. 3A is a diagram useful in explaining a certificate of a weak key stored in a key storage dedicated area appearing in FIG. 1.

FIG. 3B is a diagram useful in explaining a certificate of a strong key stored in the key storage dedicated area.

FIG. 9 is a diagram useful in explaining an encryption key list indicating that six weak keys are stored in the key storage dedicated area.

DESCRIPTION OF THE EMBODIMENTS

The present invention will now be described in detail below with reference to the accompanying drawings showing embodiments thereof.

Figure 1:
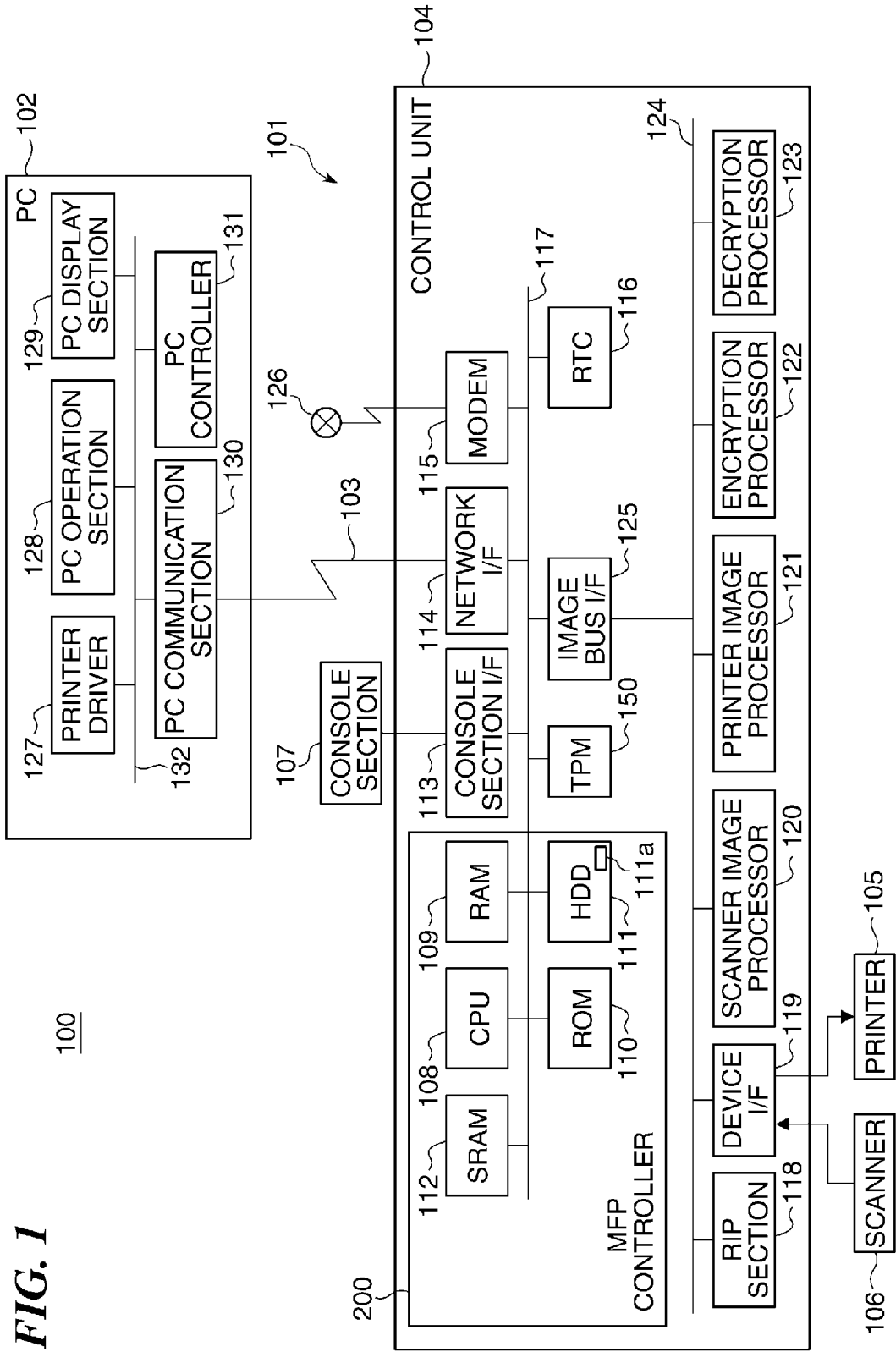
FIG. 1 is a schematic block diagram of an information processing system according to a first embodiment of the present invention, including an MFP as an information processing apparatus.

FIG. 1 is a schematic block diagram of an information processing system 100 according to a first embodiment of the present invention, including an MFP (Multi-Function Printer) 101 as an information processing apparatus.

The information processing system 100 shown in FIG. 1 includes the MFP 101 (information processing apparatus) and a client PC 102 (the other information processing apparatus), and the MFP 101 and the client PC 102 are connected to each other via a network, such as a LAN 103. The MFP 101 receives e.g. a print job from the client PC 102.

The MFP 101 includes a control unit 104 (execution unit), a printer 105, a scanner 106, and a console section 107. The control unit 104 includes a CPU 108, a RAM 109, a ROM 110, an HDD 111 (storage unit) having a key storage dedicated area 111a, an SRAM 112, a console section interface 113, a network interface 114, a modem 115, a RTC 116, and a TPM (Trusted Platform Module) 150, and these components are interconnected via a system bus 117.

The control unit 104 further includes a RIP section 118, a device interface 119, a scanner image processor 120, a printer image processor 121, an encryption processor 122, and a decryption processor 123, and these components are interconnected via an image bus 124. The system bus 117 is connected to the image bus 124 via an image bus interface 125. The console section interface 113, the network interface 114, and the modem 115 are connected to the console section 107, the LAN 103, and a public line 126, respectively, and the device interface 119 is connected to the printer 105 and the scanner 106.

The printer 105 prints e.g. image data acquired by the scanner 106 on a recording sheet. The scanner 106 reads an original, and generates image data corresponding to the read original. The console section 107 includes an operation panel, such as a liquid crystal monitor, and hard keys, and a user inputs an instruction to the MFP 101 by operating the operation panel and the hard keys.

The CPU 108 controls the components of the MFP 101 by executing programs stored in the ROM 110. The RAM 109 is a system work memory for the CPU 108, and temporarily stores image data and information received from the console section 107. The HDD 111 is a nonvolatile storage device, and stores e.g. information indicating whether or not a weak key use-inhibiting security policy is enabled, an encryption key generation inhibition flag, referred to hereinafter, and an encryption key list 600, 800, or 900, referred to hereinafter. Further, the HDD 111 stores data concerning weak keys for use in communication when the weak key use-inhibiting security policy is disabled (see FIG. 2A) and data concerning strong keys for use in communication when the weak key use-inhibiting security policy is enabled (see FIG. 2B). Note that the "weak keys" refer to encryption keys which do not have a predetermined or higher encryption strength and hence are easy to crack, and the "strong keys" refer to encryption keys having the predetermined or higher encryption strength and hence are difficult to crack.

Further, the key storage dedicated area 111a included in the HDD 111 stores encryption keys, such as weak keys and strong keys, and the HDD 111 stores a certificate associated with each weak key (see FIG. 3A) and a certificate associated with each strong key (see FIG. 3B), which are stored in the key storage dedicated area 111a. The maximum number of encryption keys which can be stored in the key storage dedicated area 111a is specified, and in the present embodiment, the maximum number of encryption keys which can be stored in the key storage dedicated area 111a is specified as 6.

The SRAM 112 is a nonvolatile storage medium that operates at a high speed, and stores e.g. various programs and data. The modem 115 transmits and receives information via the public line 126. The RTC 116 counts the date and time even when electric power is not supplied to the control unit 104. The TPM 150 performs encryption/decryption processing on data within the TPM 150, and generates an encryption key for use in performing the encryption/decryption.

The RIP section 118 converts e.g. image data written in a page description language to bitmap image data. The scanner image processor 120 performs various processing, such as correction, manipulation, and editing, on image data generated by the scanner 106. The printer image processor 121 performs various processing, such as correction, resolution conversion, and halftone processing, on image data to be printed e.g. on a recording sheet by the printer 105. The encryption processor 122 performs encryption processing on data received by the MFP 101, and the decryption processor 123 performs decryption processing on encrypted data.

The PC 102 includes a printer driver 127, a PC operation section 128, a PC display section 129, a PC communication section 130, and a PC controller 131, and these components are interconnected via a system bus 132. Further, the PC communication section 130 is connected to the LAN 103.

The printer driver 127 generates a print job. The generated print job has various print conditions set therefor. The PC operation section 128 is e.g. an input device formed by a mouse and a keyboard. The PC display section 129 is e.g. a liquid crystal monitor, and displays various information. The PC communication section 130 transmits e.g. a print job to the MFP 101 via the LAN 103. The PC controller 131 controls the components of the PC 102.

Figure 4A:
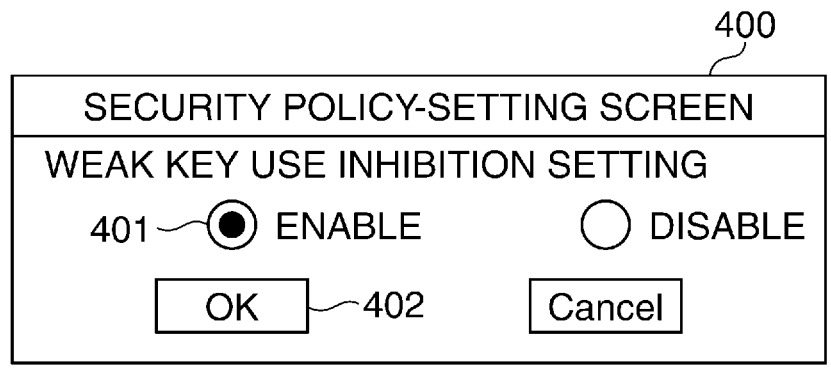
FIG. 4A is a diagram showing a security policy-setting screen displayed on a PC display section appearing in FIG. 1.
Figure 4B:
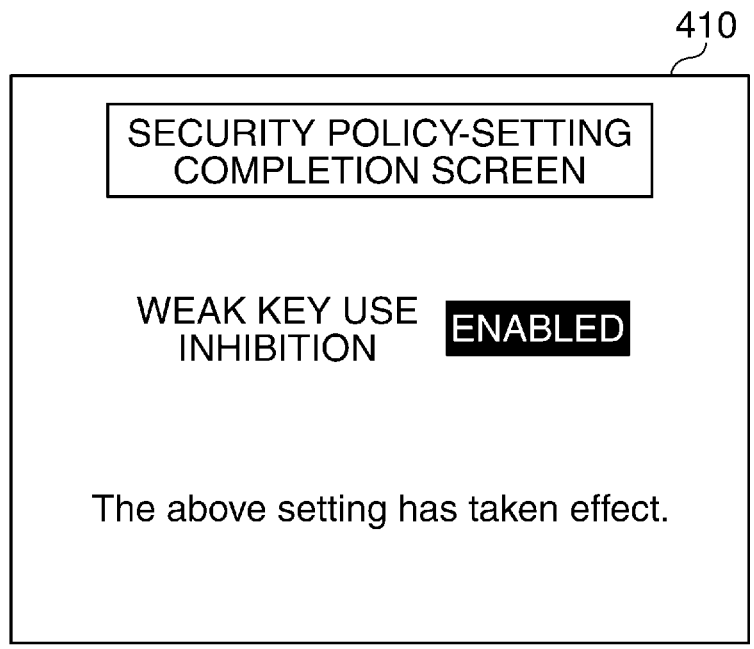
FIG. 4B is a diagram showing a security policy-setting completion screen displayed on the PC display section.

FIGS. 4A and 4B are diagrams showing a security policy-setting screen 400 and a security policy-setting completion screen 410, respectively, which are displayed on the PC display section 129 appearing in FIG. 1. The security policy-setting screen 400 shown in FIG. 4A includes a radio button 401 and an OK button 402. When a user selects the radio button 401, and then presses the OK button 402, the weak key use-inhibiting security policy is enabled in the MFP 101, and further, the security policy-setting completion screen 410, shown in FIG. 4B, for notifying the user that the weak key use-inhibiting security policy is enabled in the MFP 101 is displayed on the PC display section 129.

Figure 5:
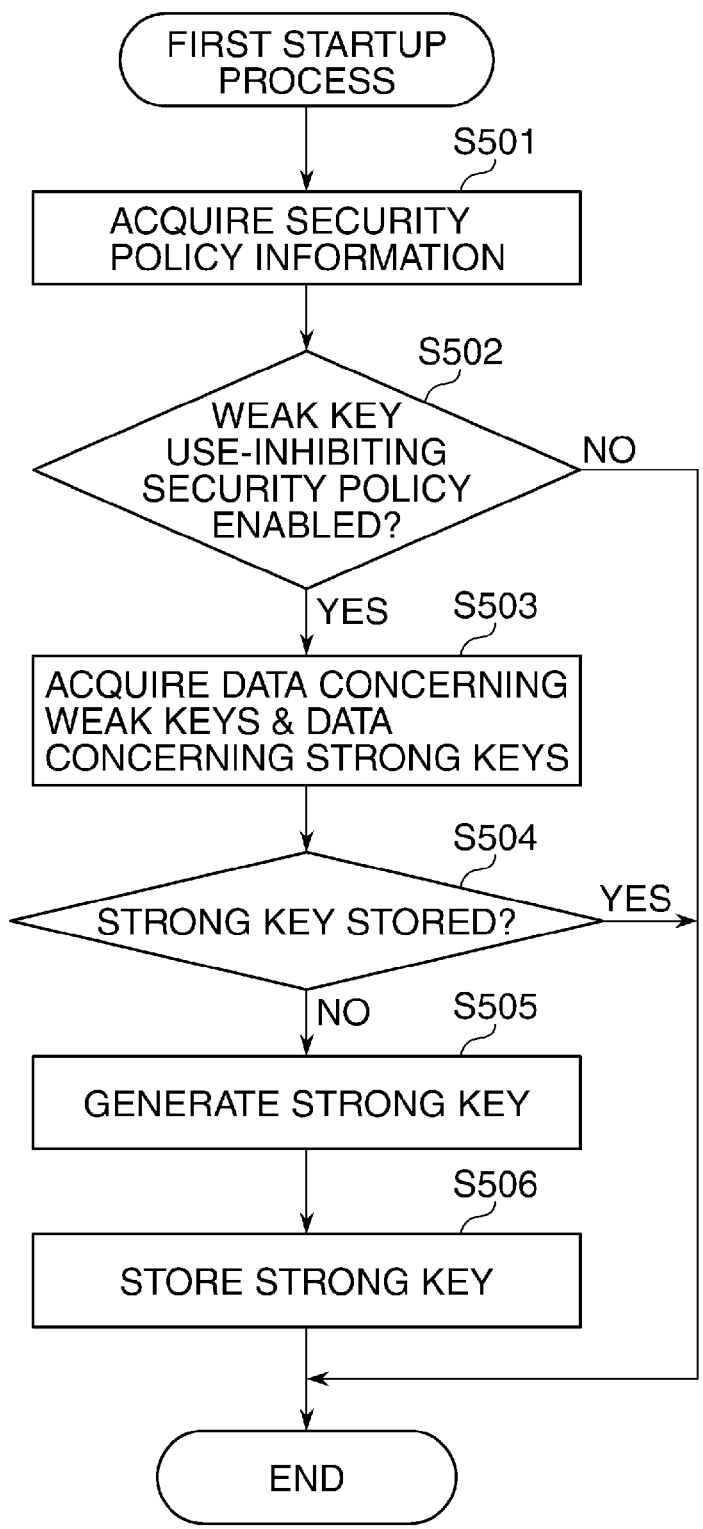
FIG. 5 is a flowchart of a first startup process performed by the MFP appearing in FIG. 1.

FIG. 5 is a flowchart of a first startup process performed by the MFP 101 appearing in FIG. 1. The first startup process in FIG. 5 is performed by an MFP controller 200 (generation unit) formed by the CPU 108, the RAM 109, the ROM 110, the HDD 111, and the SRAM 112. In the first startup process in FIG. 5, it is assumed that the number of encryption keys stored in the key storage dedicated area 111a is less than the maximum number of encryption keys which can be stored in the key storage dedicated area 111a.

Figure 6:
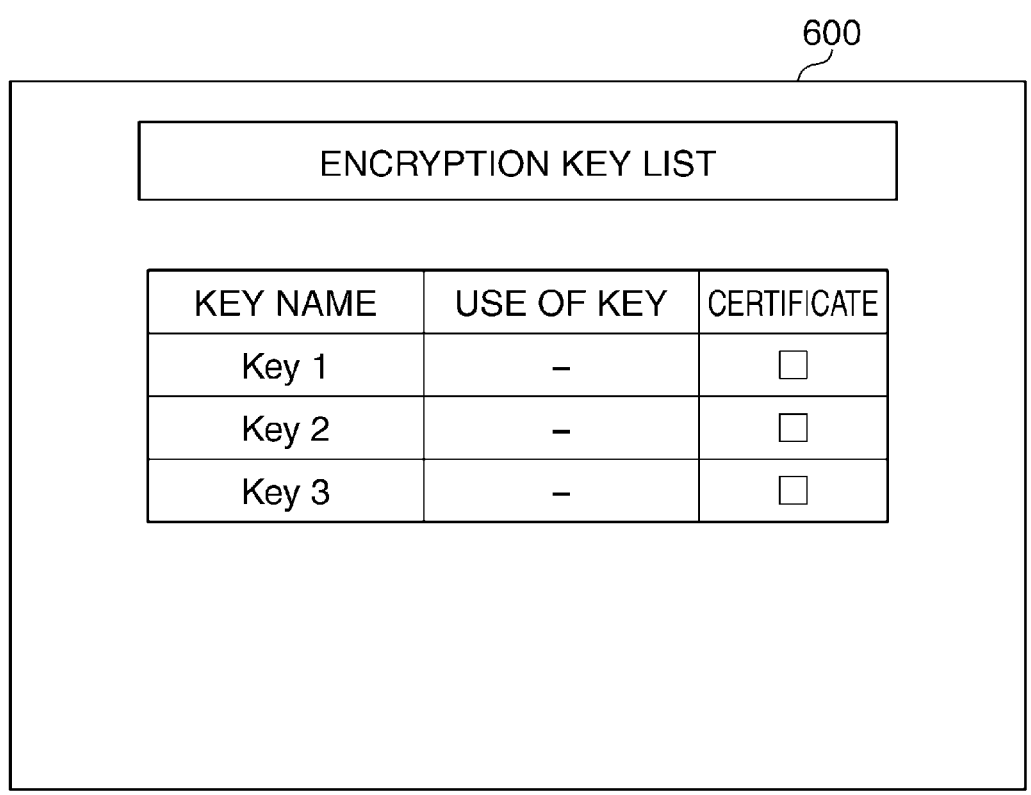
FIG. 6 is a diagram useful in explaining an encryption key list indicating that three weak keys are stored in the key storage dedicated area appearing in FIG. 1.

Referring to FIG. 5, first, when electric power is supplied to the MFP 101, the CPU 108 refers to the HDD 111 to thereby acquire information that specifies whether or not the weak key use-inhibiting security policy is enabled (step S501), and determines whether or not the weak key use-inhibiting security policy is enabled (step S502). If it is determined in the step S502 that the weak key use-inhibiting security policy is not enabled, the present process is immediately terminated, whereas if the weak key use-inhibiting security policy is enabled, the CPU 108 acquires data concerning weak keys (see FIG. 2A) and data concerning strong keys (see FIG. 2B) (step S503). Then, the CPU 108 refers to the encryption key list 600 (see FIG. 6), which is a list of encryption keys stored in the key storage dedicated area 111a, to thereby confirm that encryption keys are stored in the key storage dedicated area 111a, acquires certificates associated with the respective encryption keys stored in the key storage dedicated area 111a, and compares the acquired data concerning weak keys and data concerning strong keys with the certificates associated with the respective encryption keys stored in the key storage dedicated area 111a to thereby determine whether or not a strong key is stored in the key storage dedicated area 111a (step S504).

If it is determined in the step S504 that a strong key is stored in the key storage dedicated area 111a, the present process is immediately terminated, whereas if no strong key is stored in the key storage dedicated area 111a, the CPU 108 generates a strong key with reference to the data concerning strong keys (step S505), and stores the generated strong key in the key storage dedicated area 111 (step S506), followed by terminating the present process. The generated strong key is used when communication is performed between the MFP 101 in which the weak key use-inhibiting security policy is enabled and the client PC 102.

According to the first startup process in FIG. 5, when no strong key is stored in the key storage dedicated area 111a, a strong key is generated by consulting the data concerning strong keys (step S505), and communication between the MFP 101 in which the weak key use-inhibiting security policy is enabled and the client PC 102 is performed using the generated strong key. Therefore, even when no strong key is stored in the key storage dedicated area 111a, it is possible to perform communication at a high security level.

Next, a description will be given of a second embodiment of the present invention.

The second embodiment of the present invention is basically the same in configuration and operation as the above-described first embodiment, and differs from the first embodiment in that encryption keys the number of which is equal to the maximum number of encryption keys which can be stored in the key storage dedicated area 111a, i.e. six encryption keys, are stored in the key storage dedicated area 111a. The redundant description of the same configuration and operation as those of the first embodiment is omitted, and the following description will be given only of different points thereof.

Figure 7:
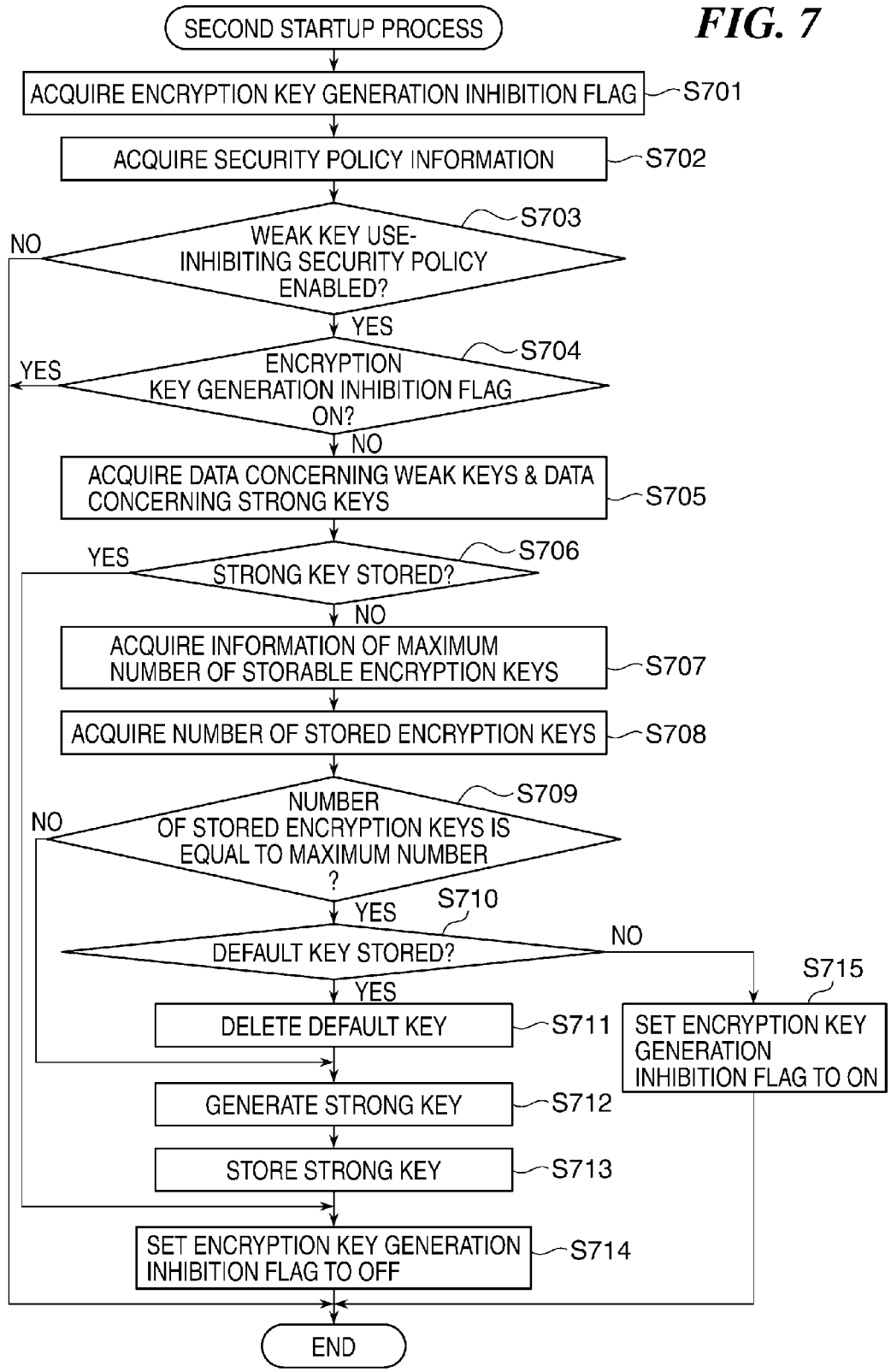
FIG. 7 is a flowchart of a second startup process performed by an MFP of an information processing system according to a second embodiment of the present invention.

FIG. 7 is a flowchart of a second startup process performed by the MFP 101 of an information processing system according to the second embodiment. The second startup process in FIG. 7 is performed by the MFP controller 200.

Referring to FIG. 7, first, when electric power is supplied to the MFP 101, the CPU 108 acquires from the HDD 111 the encryption key generation inhibition flag which is set to ON when generation of a new encryption key is inhibited, and to OFF when generation of a new encryption key is not inhibited (step S701), refers to the HDD 111 to thereby acquire information that specifies whether or not the weak key use-inhibiting security policy is enabled (step S702), and determines whether or not the weak key use-inhibiting security policy is enabled (step S703). If it is determined in the step S703 that the weak key use-inhibiting security policy is not enabled, the present process is immediately terminated, whereas if the weak key use-inhibiting security policy is enabled, the CPU 108 determines whether or not the encryption key generation inhibition flag is ON (step S704).

Figure 8:
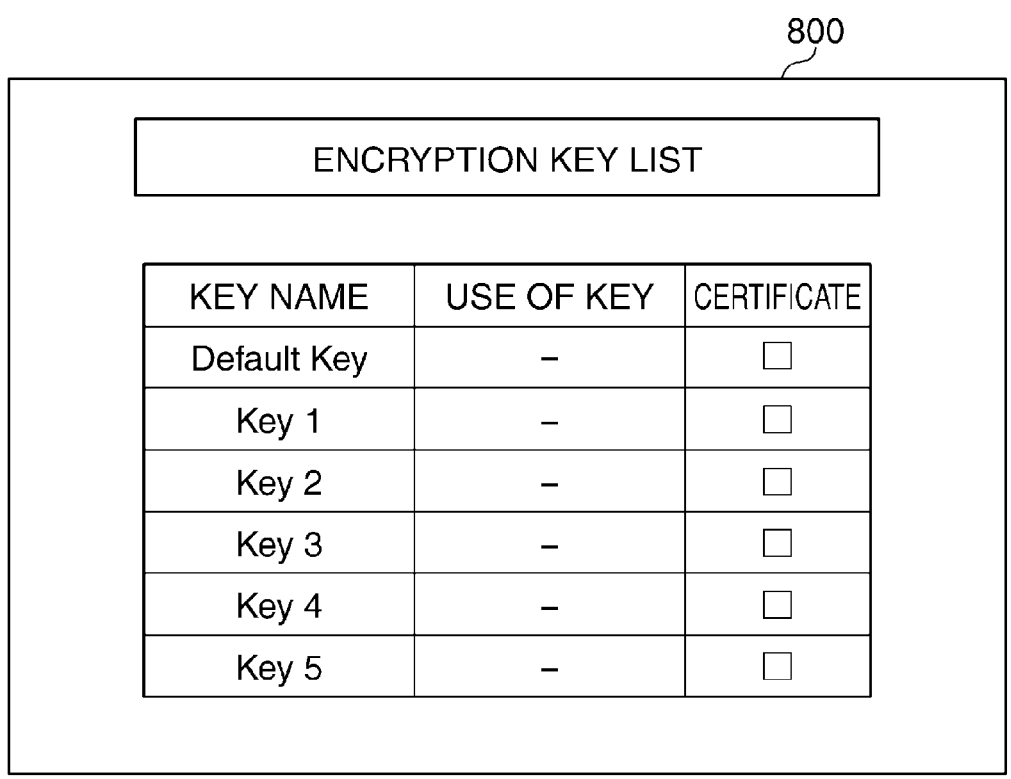
FIG. 8 is a diagram useful in explaining an encryption key list indicating that one default key and five weak keys are stored in the key storage dedicated area.
Figure 9:
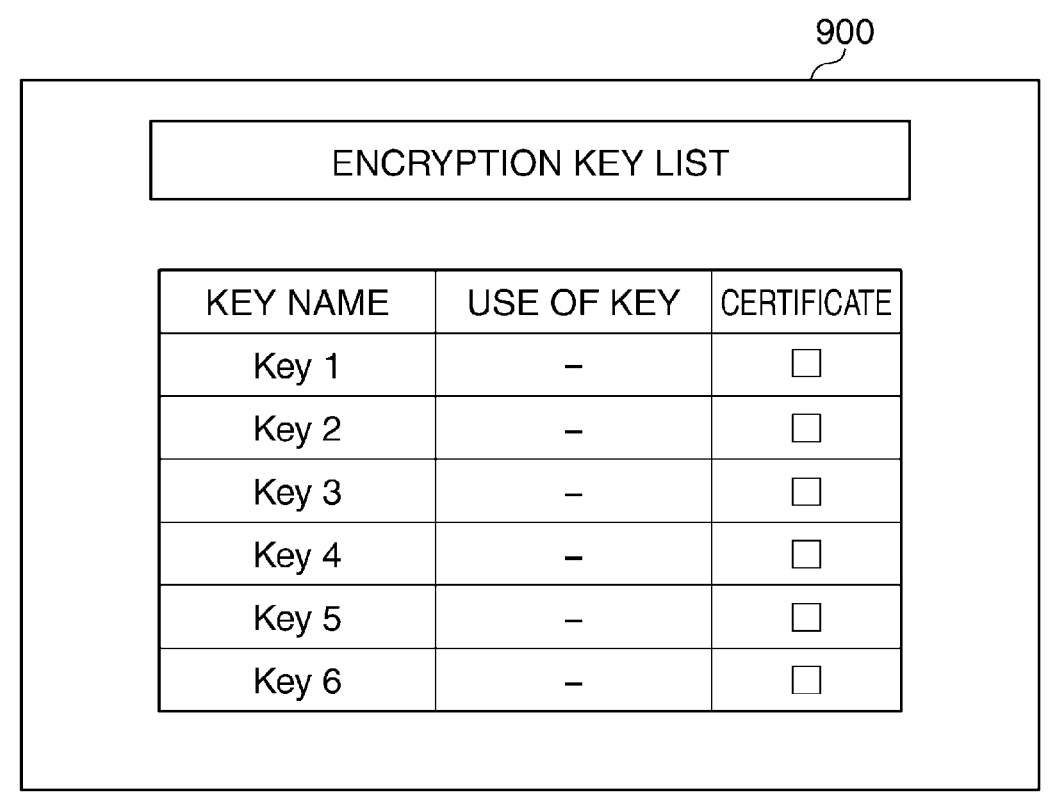

If it is determined in the step S704 that the encryption key generation inhibition flag is ON, the present process is immediately terminated, whereas if the encryption key generation inhibition flag is OFF, the CPU 108 acquires the data concerning weak keys (see FIG. 2A) and the data concerning strong keys (see FIG. 2B) (step S705), and further, the CPU 108 refers to an encryption key list stored in the key storage dedicated area 111a. In the present process, it is assumed that one of the encryption key list 800 shown in FIG. 8 and the encryption key list 900 shown in FIG. 9 is stored in the HDD 111, and the encryption key list 800 or the encryption key list 900 is referred to.

The encryption key list 800 indicates that one default key which can be made use of (more specifically, can be deleted) when generating a strong key, and five encryption keys are stored in the key storage dedicated area 111a, and the encryption key list 900 indicates that six encryption keys are stored in the key storage dedicated area 111a. Note that in the present embodiment, the CPU 108 has an authority to delete the default key stored in the key storage dedicated area 111a, but does not have an authority to delete other encryption keys than the default key which are stored in the key storage dedicated area 111a. An encryption key other than the default key, which is stored in the key storage dedicated area 111, is deleted in a case where the CPU 108 receives an instruction for deleting the encryption key from a user, thereby being given the authority to delete the same.

Referring again to FIG. 7, after confirming that the encryption keys are stored in the key storage dedicated area 111a, the CPU 108 acquires certificates associated with the respective encryption keys stored in the key storage dedicated area 111a, and compares the acquired data concerning weak keys and the data concerning strong keys with the certificates associated with the respective encryption keys stored in the key storage dedicated area 111a to thereby determine whether or not a strong key is stored in the key storage dedicated area 111a (step S706).

If it is determined in the step S706 that a strong key is stored in the key storage dedicated area 111a, the CPU 108 sets the encryption key generation inhibition flag to OFF (step S714), followed by terminating the present process. On the other hand, if no strong key is stored in the key storage dedicated area 111a, the CPU 108 acquires information of the maximum number of encryption keys which can be stored in the key storage dedicated area 111a (step S707), refers to the encryption key list 800 or the encryption key list 900 to thereby acquire information of the number of encryption keys stored in the key storage dedicated area 111a (step S708), and determines whether or not the number of encryption keys stored in the key storage dedicated area 111a is equal to the maximum number of encryption keys which can be stored in the key storage dedicated area 111a (step S709).

If it is determined in the step S709 that the number of encryption keys stored in the key storage dedicated area 111a is equal to the maximum number of encryption keys which can be stored in the key storage dedicated area 111a, the CPU 108 refers to the encryption key list 800 or the encryption key list 900 to thereby determine whether or not the default key is stored in the key storage dedicated area 111a (step S710). If it is determined in the step S710 that the default key is stored in the key storage dedicated area 111a, the CPU 108 deletes the default key from the HDD 111 (step S711), generates a strong key by consulting the data concerning the strong key (step S712), stores the generated strong key in the key storage dedicated area 111a (step S713), and proceeds to the step S714, whereas if the default key is not stored in the key storage dedicated area 111a, the CPU 108 sets the encryption key generation inhibition flag to ON (step S715), followed by terminating the present process.

If the number of encryption keys stored in the key storage dedicated area 111a is equal to the maximum number of encryption keys which can be stored in the key storage dedicated area 111a (YES to the step S709), and also no default key is stored in the key storage dedicated area 111a (NO to the step S710), the MFP controller 200, particularly the CPU 108 may request the client PC 102 to display, on the PC display section 129, a deletion request for requesting deletion of at least one of the encryption keys stored in the key storage dedicated area 111a, or a warning saying that communication between the MFP 101 and the client PC 102 using a weak key without disabling the weak key use-inhibiting security policy is not allowed.

Alternatively, if the number of encryption keys stored in the key storage dedicated area 111a is equal to the maximum number of encryption keys which can be stored in the key storage dedicated area 111a (YES to the step S709), and also no default key is stored in the key storage dedicated area 111a (NO to the step S710), the MFP controller 200, particularly the CPU 108 may request the client PC 102 to disable the weak key use-inhibiting security policy and display, on the PC display section 129, a message saying that a weak key is being used for communication between the MFP 101 and the client PC 102.

If it is determined in the step S709 that the number of encryption keys stored in the key storage dedicated area 111a is not equal to the maximum number of encryption keys which can be stored in the key storage dedicated area 111a, the CPU 108 skips the steps S710 and S711, and proceeds to the step S712. The strong key generated in the present embodiment is used when communication is performed between the MFP 101 in which the weak key use-inhibiting security policy is enabled and the client PC 102.

According to the second startup process in FIG. 7, when the number of encryption keys stored in the key storage dedicated area 111a is equal to the maximum number of encryption keys which can be stored in the key storage dedicated area 111a (YES to the step S709), and also the default key is stored in the key storage dedicated area 111a (YES to the step S710), the default key is deleted from the HDD 111 (step S711), and a strong key is generated by consulting the data concerning strong keys (step S712). Therefore, it is possible to avoid a situation where a strong key is not generated because the strong key cannot be stored in the key storage dedicated area 111a.

Further, according to the second startup process in FIG. 7, when communication between the MFP 101 and the client PC 102 is not performed because the number of encryption keys stored in the key storage dedicated area 111a is equal to the maximum number of encryption keys which can be stored in the key storage dedicated area 111a (YES to the step S709) and no default key is stored in the key storage dedicated area 111a (NO to the step S710), the encryption key generation inhibition flag is set to ON (step S715). That is, the case where the encryption key generation inhibition flag is set to ON when communication between the MFP 101 and the client PC 102 is not performed is none other than a case where the number of encryption keys stored in the key storage dedicated area 111a is equal to the maximum number of encryption keys which can be stored in the key storage dedicated area 111a and also no default key is stored in the key storage dedicated area 111a. Therefore, the user having confirmed that the encryption key generation inhibition flag is set to ON can easily grasp that the reason that communication between the MFP 101 and the client PC 102 is not executed is that encryption keys corresponding in number to the maximum number of encryption keys which can be stored in the key storage dedicated area 111a are stored in the key storage dedicated area 111a, and hence a new encryption key necessary to perform communication between the MFP 101 and the client PC 102 cannot be generated.

Further, as described above, in the second startup process in FIG. 7, when the number of encryption keys stored in the key storage dedicated area 111a is equal to the maximum number of encryption keys which can be stored in the key storage dedicated area 111a (YES to the step S709), and also the default key is not stored in the key storage dedicated area 111a (NO to the step S710), the client PC 102 may be requested to display on the PC display section 129 a deletion request for requesting deletion of at least one of the encryption keys stored in the key storage dedicated area 111a. In this case, the user can recognize from the display on the PC display section 129 the need of deleting an encryption key from the key storage dedicated area 111a so as to perform communication between the MFP 101 and the client PC 102 at a high security level.

Further, as described above, in the second startup process in FIG. 7, when the number of encryption keys stored in the key storage dedicated area 111a is equal to the maximum number of encryption keys which can be stored in the key storage dedicated area 111a (YES to the step S709), and no default key is stored in the key storage dedicated area 111a (NO to the step S710), the client PC 102 may be requested to display on the PC display section 129 a warning saying that communication between the MFP 101 and the client PC 102 using a weak key without disabling the weak key use-inhibiting security policy is not allowed. In this case, the user can recognize that communication between the MFP 101 and the client PC 102 using a weak key which is low in security level is not executed, and as a result, communication at a high security level is ensured.

Further, as described above, in the second startup process in FIG. 7, when the number of encryption keys stored in the key storage dedicated area 111a is equal to the maximum number of encryption keys which can be stored in the key storage dedicated area 111a (YES to the step S709), and no default key is stored in the key storage dedicated area 111a (NO to the step S710), the client PC 102 may be requested to display on the PC display section 129 a message saying that the weak key use-inhibiting security policy is disabled and a weak key is being used for communication between the MFP 101 and the client PC 102. In this case, the user can recognize that the communication between the MFP 101 and the client PC 102 is at a low security level.

Although in the first and second embodiments, cases where a strong key is generated at the start of the MFP 101 are described, the strong key may be generated by a user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-083192 filed Apr. 15, 2015, which is hereby incorporated by reference herein in its entirety.

What is claimed is:

1. An information processing system including a first information processing apparatus and a second information processing apparatus that is connected to the first information processing apparatus, the system comprising:
a storage unit configured to store one or more encryption keys, each key of the one or more encryption keys having an associated encryption strength;
a control unit configured to:
acquire a security policy specifying a predetermined encryption strength for performing communication between the first information processing apparatus and the second information processing apparatus; and
determine whether the one or more encryption keys stored in the storage unit include at least one key having an associated encryption strength equal to or higher than the predetermined encryption strength specified by the security policy in a case where the acquired security policy includes a setting for inhibiting use of a key which has an encryption strength lower than the predetermined encryption strength;
a generation unit configured to generate a new encryption key that is different from the one or more encryption keys stored in the storage unit, the new encryption key having an associated encryption strength equal to or higher than the predetermined encryption strength, in a case where it is determined that the storage unit does not include at least one key having an associated encryption strength equal to or higher than the predetermined encryption strength specified by the security policy; and
an execution unit configured to perform communication between the first information processing apparatus and the second information processing apparatus using the generated new encryption key,
wherein the control unit, in accordance with a maximum number of encryption keys being stored in the storage unit, controls
the generation unit to generate the new encryption key, while deleting a default encryption key stored in the storage unit, and
if no default encryption key is stored in the storage unit, the generation unit to generate the new encryption key, while deleting an encryption key stored in the storage unit and specified by a deletion request.

2. The information processing system according to claim 1, wherein a security level of communication between the first information processing apparatus and the second information processing apparatus using the one or more encryption keys stored in the storage unit is lower than a security level of communication between the first information processing apparatus and the second information processing apparatus using the new encryption key.

3. The information processing system according to claim 1, further comprising a security policy-setting unit configured to enable or disable the security policy that specifies inhibition of use of the one or more encryption keys.

4. The information processing system according to claim 1, further comprising a display unit configured to display, in the case where the maximum number of encryption keys are stored in the storage unit, the deletion request for specifying the encryption key to be deleted from the storage unit when it is determined that the default key is not stored in the storage unit.

5. The information processing system according to claim 4, wherein, in the case where the one or more encryption keys corresponding in number to the maximum number are stored in the storage unit and it is determined that the default key is not stored in the storage unit, and also a selected encryption key of the one or more encryption keys is used for communication between the first information processing apparatus and the second information processing apparatus, the security policy-setting unit disables the security policy, and the display unit displays a message to the effect that communication between the first information processing apparatus and the second information processing apparatus is executed using the selected encryption key.

6. The information processing system according to claim 4, wherein in the case where the one or more encryption keys corresponding in number to the maximum number are stored in the storage unit and it is determined that the default key is not stored in the storage unit, the security policy-setting unit enables the security policy, and the display unit displays inhibition of communication between the first information processing apparatus and the second information processing apparatus.

7. A first information processing apparatus that is connected to a second information processing apparatus, the first information apparatus comprising:
   a storage unit configured to store one or more encryption keys, each key of the one or more encryption keys having an associated encryption strength;
   a control unit configured to:
      acquire a security policy specifying a predetermined encryption strength for performing communication between the first information processing apparatus and the second information processing apparatus; and
      determine whether the one or more encryption keys stored in the storage unit include at least one key having an associated encryption strength equal to or higher than the predetermined encryption strength specified by the security policy in a case where the acquired security policy includes a setting for inhibiting use of a key which has a encryption strength lower than the predetermined encryption strength;
   a generation unit configured to generate a new encryption key that is different from the one or more encryption keys stored in the storage unit, the new encryption key having an associated encryption strength equal to or higher than the predetermined encryption strength, in a case where it is determined that the storage unit does not include at least one key having an associated encryption strength equal to or higher than the predetermined encryption strength specified by the security policy; and
   an execution unit configured to perform communication between the first information processing apparatus and the second information processing apparatus using the generated new encryption key,
   wherein the control unit, in accordance with a maximum number of encryption keys being stored in the storage unit, controls
      the generation unit to generate the new encryption key, while deleting a default encryption key stored in the storage unit, and
      if no default encryption key is stored in the storage unit, the generation unit to generate the new encryption key, while deleting an encryption key stored in the storage unit and specified by a deletion request.

8. A method of controlling an information processing system including a first information processing apparatus and a second information processing apparatus that is connected to the first information processing apparatus, the method comprising:
   storing one or more encryption keys, each key of the one or more encryption keys having an associated encryption strength;
   acquiring a security policy specifying a predetermined encryption strength for performing communication between the first information processing apparatus and the second information processing apparatus; and
   determining whether the one or more encryption keys stored in the storage unit include at least one key having an associated encryption strength equal to or higher than the predetermined encryption strength specified by the security policy in a case where the acquired security policy includes a setting for inhibiting use of a key which has a encryption strength lower than the predetermined encryption strength;
   generating a new encryption key that is different from the stored one or more encryption keys, the new encryption key having an associated encryption strength equal to or higher than the predetermined encryption strength, in a case where it is determined that the stored one or more encryption keys do not include at least one key having an associated encryption strength equal to or higher than the predetermined encryption strength specified by the security policy; and
   performing communication between the first information processing apparatus and the second information processing apparatus using the generated new encryption key,
   wherein generating the new encryption key includes, in accordance with a maximum number of encryption keys being stored in the storage unit, generating the new encryption key while deleting a default encryption key stored in the storage unit, and if no default encryption key is stored in the storage unit, generating the new encryption key while deleting an encryption key stored in the storage unit and specified by a deletion request.

9. A non-transitory computer-readable storage medium storing a computer-executable control program for causing a computer to execute a method of controlling an information processing system including a first information processing apparatus and a second information processing apparatus that is connected to the first information processing apparatus, wherein the method comprises:
   storing one or more encryption keys, each key of the one or more encryption keys having an associated encryption strength;
   acquiring a security policy specifying a predetermined encryption strength for performing communication between the first information processing apparatus and the second information processing apparatus; and
   determining whether the one or more encryption keys stored in the storage unit include at least one key having an associated encryption strength equal to or higher than the predetermined encryption strength specified by the security policy in a case where the acquired security policy includes a setting for inhibiting use of a key which has a encryption strength lower than the predetermined encryption strength;
   generating an a new encryption key that is different from the stored one or more encryption keys, the new encryption key having an associated encryption strength equal to or higher than the predetermined encryption strength, in a case where it is determined that the stored one or more encryption keys do not include at least one key having an associated encryption strength equal to or higher than the predetermined encryption strength specified by the security policy; and
   performing communication between the first information processing apparatus and the second information processing apparatus using the generated new encryption, wherein generating the new encryption key includes, in accordance with a maximum number of encryption keys being stored in the storage unit, generating the new encryption key while deleting a default encryption key stored in the storage unit, and if no default encryption key is stored in the storage unit, generating the new encryption key while deleting an encryption key stored in the storage unit and specified by a deletion request.

* * * * *